US012739283B2

(12) United States Patent
Chen et al.

(10) Patent No.: US 12,739,283 B2
(45) Date of Patent: Sep. 15, 2026

(54) SECURITY POLICY MANAGEMENT

(71) Applicant: Microsoft Technology Licensing, LLC, Redmond, WA (US)

(72) Inventors: Jinghua Chen, Redmond, WA (US); Wen Xu, Issaquah, WA (US); Gautam Prasad, Hyderabad (IN); Mayur Gul Warialani, Hyderabad (IN); Juchuan Song, Bellevue, WA (US); Arun Kumar, Hyderabad (IN); Palak Bhatia, Delhi (IN); Ashish Mehndi, Hyderabad (IN); Vinayak Nadir, New Delhi (IN); Kunal Verma, Udaipur (IN); Talhah Munawar Mir, Bothwell, WA (US); Deepika Puri Gakhar, Syosset, NY (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 97 days.

(21) Appl. No.: 18/932,544

(22) Filed: Oct. 30, 2024

(65) Prior Publication Data

US 2026/0095487 A1 Apr. 2, 2026

(30) Foreign Application Priority Data

Sep. 27, 2024 (IN) ............................ 202411073357

(51) Int. Cl.
*H04L 9/40* (2022.01)
*H04L 41/16* (2022.01)
*H04L 41/22* (2022.01)

(52) U.S. Cl.
CPC ............. *H04L 63/20* (2013.01); *H04L 41/16* (2013.01); *H04L 41/22* (2013.01)

(58) Field of Classification Search
CPC .......... H04L 63/20; H04L 41/16; H04L 41/22
See application file for complete search history.

(56) References Cited

U.S. PATENT DOCUMENTS

2009/0060047 A1* 3/2009 Schneider ............... H03M 7/40 375/240.23
2013/0218911 A1* 8/2013 Li ........................... G06F 16/21 707/E17.069

FOREIGN PATENT DOCUMENTS

CN 117112572 A * 11/2023 ......... G06F 16/2282
CN 119127913 A * 12/2024 ............... G06N 5/04

OTHER PUBLICATIONS

International Search Report and Written Opinion received for PCT Application No. PCT/US2025/038556, mailed on Apr. 2, 2026, 15 pages.

* cited by examiner

*Primary Examiner* — Linglan Edwards
*Assistant Examiner* — Kamryn J Gillespie
(74) *Attorney, Agent, or Firm* — Barta Jones, PLLC

(57) ABSTRACT

In various examples, input queries (e.g. open user queries) are used combination with predefined queries to perform security policy-related actions using a generative machine learning (GML) model or GML models. In one example, an input query relating to a security policy is matched with a predefined query stored in an instruction database. In some examples, the instruction database contains examples of structured configuration data, which in turn can be used by a GML model to configure a predetermined extractor code module to perform a specific policy-related action. In other examples, a security context relating to a security policy is used together with an input query and template query to generate a GML model query. In some examples, the two approaches are combined.

20 Claims, 6 Drawing Sheets

SECURITY POLICY MANAGEMENT

TECHNICAL FIELD

The present disclosure pertains to security policy management.

BACKGROUND

Security policies encompass a wide range of measures designed to safeguard data, network or systems from unauthorised access, misuse, or theft. A security policy is supported by a set of infrastructure (such as one or more endpoint agents, one or more network appliances, and/or one or more cloud services etc.) to implement and enforce the security policy within a system (which may for example include cloud-based locations, endpoint devices, and/or on-premises systems). For example, a data loss prevention policy controls actions such as sharing, transfer, or use of sensitive data. As another example, a data or information protection policy controls actions such as access, use, disclosure, disruption, modification, or destruction of data or information.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

In various examples, input queries (e.g. open user queries) are used combination with predefined queries to perform security policy-related actions using a generative machine learning (GML) model or GML models. In one example, an input query relating to a security policy is matched with a predefined query stored in an instruction database. In some examples, the instruction database contains examples of structured configuration data, which in turn can be used by a GML model to configure a predetermined extractor code module to perform a specific policy-related actions. In other examples, a security context relating to a security policy is used together with an input query and template query to generate a GML model query. In some examples, the two approaches are combined.

BRIEF DESCRIPTION OF FIGURES

Particular embodiments will now be described by way of example only, with reference to the following figures in which.

DETAILED DESCRIPTION

A portion of the disclosure of this patent document contains material which is subject to copyright protection, such as template prompts, code snippets, examples of structured configuration outputs etc. The copyright owner has no objection to the facsimile reproduction by anyone of the patent document or the patent disclosure, as it appears in the Patent and Trademark Office patent file or records, but otherwise reserves all copyright rights whatsoever.

Figure 1:
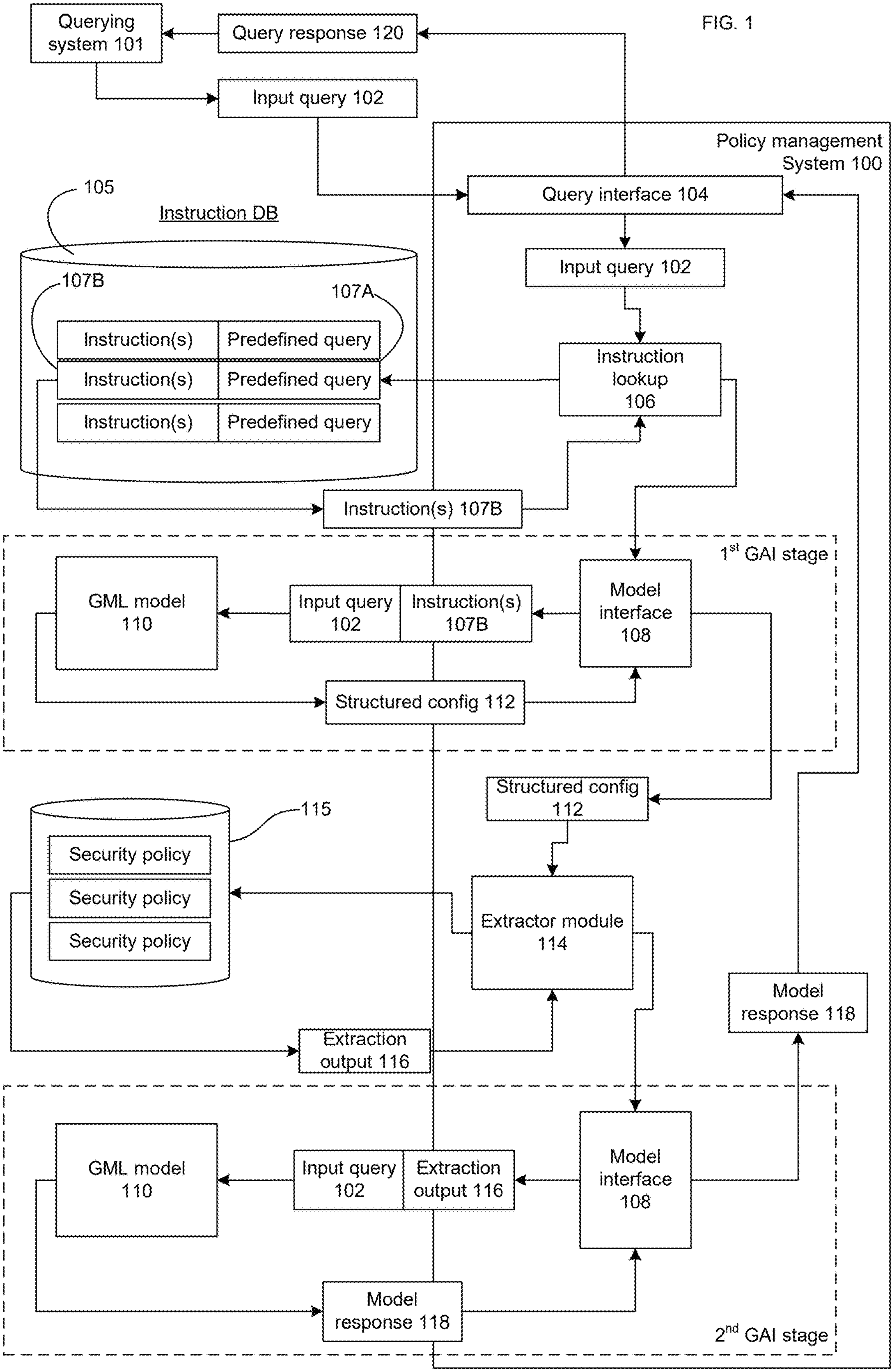
FIG. 1 depicts a schematic block diagram of an example first policy management system.

FIG. 1 depicts a policy management system 100 which enables a user to manage a security policy or policies via unstructured input queries. Improved policy management yields consequent improvements in the security of a device, system, network or other entity to which a policy is applied (our is recommended to be applied), as it enabled gaps, inconsistencies or other security policy issues to be detected and mitigated, e.g. by generating and deploying new security policies or modifying existing security policies. Improvements in machine efficiency and human-machine interaction efficiency are achieved in the policy management system 100 by increasing the speed and reducing the number of human-machine interactions to carry our policy-related actions, such as generating new security policies or modifying existing security policies. In some examples, a two-stage process involves the use of GML to generate a structured configuration output for configuring a predetermined extractor code module, whose output is used in a second GML stage. This two-stage approach improves overall GML performance, by supplementing GML-based processing with 'classical' rules based processing, which in turn has consequent improvements in system security and policy management efficiency. In some examples, a security context indicator is determined and used to guide the GML processing (e.g., using a template query that can be readily customized to a particular security context, such as data loss prevention, antivirus, website blocking, firewall configuration etc.) By tailoring GML processing toa specific context, overall GML performance is improved, yielding consequent improvements in system security and policy management efficiency.

The policy management system 100 is shown to comprise a query interface 104, an instruction lookup module 106, a model interface 108 and an extractor module 114.

The query interface 104 is configured to receive an input query 102, which has the form of a natural language prompt or other unstructured prompts (e.g. multi-modal prompt) in this example. However, in general, an input query can be any form of input, including for example a structured input, voice command, image etc. A policy-related input query comprises one or more policy identifier or other policy indicators in one embodiments. Note, the term "query" is used herein in a broad sense to refer to an input to an interface, model, system, or an example of such an input (e.g. a predefined input), or a template for constructing such an input, etc., and in particular the term does not necessary imply a question. In some examples, a query is or comprises a direct instruction or command (natural language or structured) to perform a specific action. Some examples of such queries are given below.

Generative artificial intelligence (GAI) is used to interpret such input queries, meaning the input queries are not required to conform to a specific structure or syntax. GAI refers to a generative machine learning (GML) model or collection of multiple GML models. Examples of generative models architectures include GPT, Falcon, Llama, etc. Some embodiments use a multimodal GML model with ability to receive and/or generate inputs/outputs comprising a modality other than text, such as audio data, image data, etc. Some embodiments use uni-modal GML model(s), which may be text-based or configured to operate on a modality other than text, such as image or audio. For example, direct audio-to-audio generative architectures have recently been developed. In the field of machine learning (ML), GAI has proven itself a powerful tool in accurately interpreting unstructured input queries. However, despite recent advances, GMLs still exhibit unpredictable behavior from time-to-time, including so-called "hallucinations" (plausible but factually incorrect outputs). Current state-of-the art GML models are stochastic by nature, which makes them powerful but also unpredictable. Current generation GAI has been shown to perform particularly poorly on certain specific categories of tasks.

In some contexts, unpredictable GAI behavior is an inconvenience. However, when GIA is used in a security context, such behavior can have critical security implications unless it is robustly managed.

In the present system, the power of GAI is leveraged, but with robust safeguards to mitigate its inherent unpredictability. The system is supported by a GML model 110, with safeguards based on a combination of robust prompt engineering and the extractor module 114.

The extractor module 114 is a simpler (non-GML) predetermined code module, such as a rules-based code module, also known as a 'classical' or procedural code module. The extractor module 114 is used to implement a specific type of task to which the GML model(s) is less well suited. In some implementations, the extractor module comprises multiple sub-modules to implement different specific tasks, such as policy filtering, policy aggregation and policy selection.

The extractor module 114 is configurable via structured configuration data, having a predefined structure and syntax, meaning the extractor module 114 can interpret the structured configuration data using classical deterministic programming techniques for interpreting structured data such as parsing.

In the example of FIG. 1, the query interface 104 is shown to receive the input query 102 from a querying system 101. In some embodiments, the querying system 101 is local to the policy management system 100. In other embodiments, the querying system 101 is remote from the policy management system 100. In some implementations, the querying system 101 is a user interface (UI) local to or remote from the policy management system 100. In such implementations, the input query 102 is user-generated.

In other embodiments, the querying system 101 comprises an agent (e.g. autonomous agent) that generates the input query 102. For example, in some implementations, an autonomous agent autonomously generates the input query 102 and autonomously performs or triggers a security mitigation action based on a model response 118 or query response 120 returned in response to the input query 102 (see below). Examples of such actions include modifying, activating, or deactivating a security policy to which the input query 102 relates, generating an alert relating to the security policy etc. Examples of other possible security mitigation actions are given below.

The query interface 104 passes the input query 102 to the instruction lookup module 106. An instruction database 105 is shown accessible to the instruction lookup module 106. The instruction database 105 stores multiple entries, where each entry comprises a predefined query and one or more associated predetermined instructions. The instruction lookup module 106 matches the input query 102 with a predefined query 107A held in the instruction database 105. This enables the instruction look up module 106 to retrieve a predetermined configuration instruction (or instructions) 107B associated with the matching predefined query 107A.

In some implementations, the input query 102 can be matched with multiple predefined queries to enable least one configuration instruction for each matching predefined query to be retrieved. The predefined query 107A has a form comparable to the input query 104. In this example, the predefined query 107A is a natural language prompt (e.g. containing a question, direct instruction or command etc. expressed in natural language), but it could take other forms such as a predefined structured input, voice command, image etc.

In one embodiment, the instruction database 105 is implemented as a vector database (VDB) and a predefined query embedding vector is additionally stored in the instruction database 105. The predefined query embedding vector is a vector embedding of the predefined query generated using an encoder applied to the predefined query. Examples of suitable encoders include natural language sentence encoders such as Universal Sentence Encoder, BERT, ROBERTa, DistilBERT, ALBERT etc. With non-text or multi modal inputs, examples of suitable audio encoders include EnCodec, SoundStream etc. Examples of suitable image encoders include Convolutional Autoencoder, PyTorch Image Models etc. The predefined query embedding vector is generated and stored offline in one implementation, prior to receiving the input query 102. On receiving the input query 102, the instruction lookup module 106 vector-encodes the input query 102 in the same way, resulting in an input query embedding vector (vector embedding of the input query 102). The input query embedding vector is used to search the instruction database 105 by comparing the input query embedding vector with the predefined query embedding vectors stored in the instruction database 105. In some implementations, a distance between the input query embedding vector and a predefined query embedding vector (e.g. Euclidian or cosine distance) is computed and used as a measure of query similarity. In some such implementations, a distance threshold is compared to the computed distance to assess query similarity. Examples of suitable similarity search algorithms include for example nearest-neighbour, k-nearest neighbour, k-means clustering etc. For example, in some implementations, a match is taken as a nearest neighbour embedding to the input query embedding vector the k-nearest neighbour embeddings are taken as matches. In other examples, matching predefined query embedding vectors are taken as those assigned to a same cluster as the input query embedding vector.

The instruction lookup module 106 passes the retrieved configuration instruction 107B to the model interface 108. The model interface 108, in turn, passes the input query 102 with the extracted instruction 107B to the GML model 110, in a first model query. A model query takes the form of a prompt or series of multiple prompts in one implementation. More generally, a model query can be any form of input to a model, such as an open natural language query (e.g. containing a question, direct instruction or command etc.), structured input, image, audio command, direct instruction etc.

The configuration instruction 107B in the first model query causes the GML model 110 to generate a structured configuration output 112 that conforms to the structure and syntax of the extractor module 114. The structured configuration output is formed of structured configuration data in the sense described above. In the examples described in further detail below, the configuration instruction 107B conveys the structure and syntax in manner interpretable to the GML model 110.

The structured configuration output 112 is bespoke to the input query 102, but guided by the predetermined configuration instruction 107B retrieved from the instruction database 105.

The model interface 108 causes the extractor module 114 to be executed on one or more security policies 115 based on the structured configuration output 112, resulting in an extraction output 116 (e.g. filtered subset of policies, aggregate policy data etc.). The extractor module 114 extracts the extraction output 116 from the security policy or policies 115 in accordance with the structured configuration output 112.

Thus, rather than using the GML model 110 to extract the extraction output 116 directly from the security policy or policies 115 (involving an extraction task or tasks to which the GML 110 is not necessarily well suited), instead the GML model 110 is used to appropriately configure the extractor module 114 to do so. The instruction database 105 contain predetermined instructions that enable the GML model 110 to be used in this way for a wide range of possible input queries.

In this example, the GML model 110 is used in a first GAI stage to generate the structured configuration output 112, and also in a second GAI stage to interpret the resulting extraction output 116. In other embodiments, a second GML model is used in the second GAI stage. Either way, the extractor module 114 passes, in a second model query (e.g. prompt or series of prompts) the extraction output 116 to the model interface 108, which in turn passes the extraction output 116 to the GML model 110 (or to the second GML model) with the input query 102. Note, the input query 102 is used both in the first GAI stage (to generate the structured configuration output 112) and in the second GAI stage (to interpret the resulting extraction output 116).

The GML model 110 returns, to the model interface 108, a model response 118 in response to the input query 102 and the extraction output 116.

The model interface 108 passes the model response 118 back to the query interface 104. The query interface causes an action to be performed based on the model response 118. In this example, the action comprises returning a query response 120 to the querying system. In other implementations, the action alternatively or additionally comprises creating a new security policy, updating or otherwise modifying an existing security policy (e.g. one of the security policies 115), or performing a security mitigation action based on a security policy (e.g. one of the security policies 115). For example, the input query 102 could request a modification or update of one of the policies 115, or request that a mitigation action is performed in accordance with one of the policies 115. The model response 118 generated from the extraction output 116 is used for this purpose. Examples of security mitigation actions include isolating or quarantining an entity, or revoking or modifying an access privilege of an entity (e.g. user, device, process, application, service, system etc.), or modifying a setting or parameter of a computing system (e.g. a computer, or a network of computers). For example, if a policy gap is identified, a recommended policy action is automatically implemented in some examples. Another example of such an action is activating an inactive policy or deactivating an active policy.

Policy selection means selecting relevant policy elements, e.g. selecting a subset of properties across all properties 115. Aggregation and/or filtering are applied to the selected policy properties in some implementations, to further reduce the amount of policy-related data that is passed to the GML model 110 in the second GAI stage.

In some implementations, policy selection or policy filtering is based on techniques such as string matching (e.g., exact matching), regular expression matching or other 'soft' string matching, value matching (e.g., exact or within a predefined range) etc. In some implementation, policy aggregation uses rules-based processing, such as counting algorithms or conditional counting algorithms (which count a number of elements satisfying a predetermined condition or conditions).

In some embodiments, the one or more security policies 115 are temporarily stored in a policy in a cache (e.g. in-memory cache, distributed cache etc.), with the predetermined extractor code module 114 operating on the security policy or policies 115 stored in the cache. This improves efficiency by reducing backend calls to access the security policy or policies 115 (the security policy or policies 115 need only be retrieved once for caching, rather than repeatedly accessing the security policy or policies 115 through repeated backend calls).

Although not depicted in FIG. 1, the second GAI stage may also be supported by additional predetermined information. For example, in one implementation, context data associated with the predefined query 107A is additionally retrieved from the instruction database 105, and the context data is provided with the input query 102 and the extraction output 116. Example policy types include Data Loss Prevention (DLP) Policy, which automatically blocks or encrypts sensitive data from being sent outside the organization via email or other means; Website Blocking Policy, which restricts access to specific websites or categories of websites deemed inappropriate or harmful; Antivirus Policy, which ensures that all devices have up-to-date antivirus software installed and running; Firewall Policy, which defines rules for inbound and outbound network traffic to protect against unauthorized access; Encryption Policy, which mandates the use of encryption for sensitive data both at rest and in transit; Patch Management Policy, which requires regular updates and patches to be applied to all software and systems to mitigate vulnerabilities; Multi-Factor Authentication (MFA) Policy, which enforces the use of multiple forms of verification before granting access to systems or data; Email Filtering Policy, which uses filters to block spam, phishing attempts, and malicious attachments; and Access Control List (ACL) Policy, which specifies which users or systems are allowed to access certain resources and what actions they can perform; and Backup Policy, which ensures regular backups of critical data and systems, with specific retention and recovery procedures.

Figure 2:
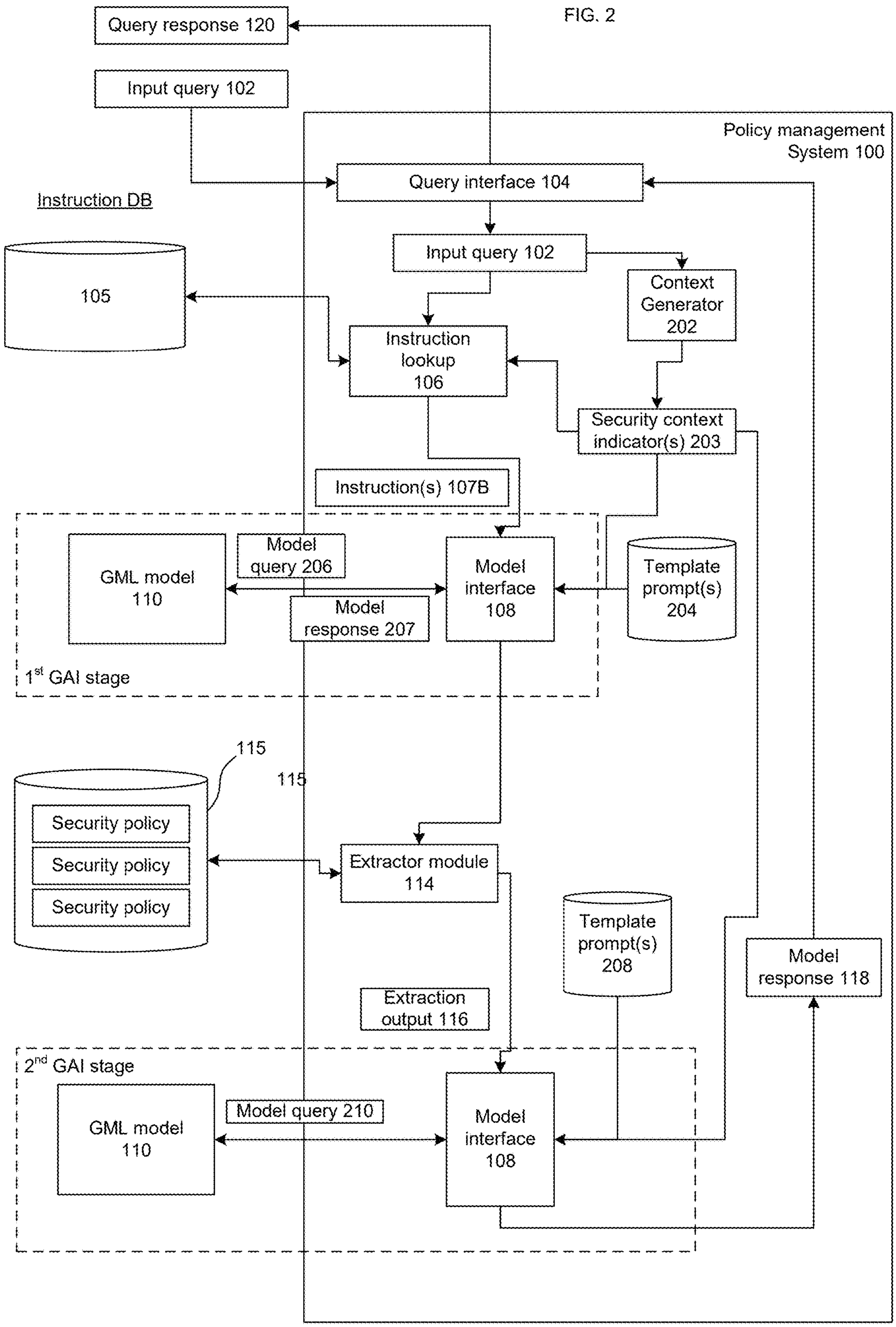
FIG. 2 depicts a schematic block diagram of an example second policy management system.

FIG. 2 shows an extended implementation of the policy management system of FIG. 1 to incorporate additional security context relating to the policy or policies 115 in question. Certain components shown in FIG. 1 are omitted for conciseness.

The policy management system 100 is shown to additionally comprise a context generator 202, which receives the input query 102 and extracts one or more security context indicator(s) 203 from the input query 102, such as a policy type(s) of the security policy (or policies) 115. More generally, a security indicator indicates a relevant security context (relevant to the policy or policies 115).

The instruction lookup module 106 uses the security context indicator(s) to perform the search of the instruction database 105, e.g. restricting the search to entries relevant to the security context. To support this, entries in the instruction database 105 may contain additional context data that can be matched to a context indicator, or the entries may be organized by context.

As described above, in the first GAI stage, the model interface 108 generates a first model query 206 based on the input query 102 and the configuration instruction(s) 107B. In FIG. 2, a security context indicator extracted by the context generator 202 is also used to generate the first model query 206. In this particular example, a first template prompt 204 is populated with the security indicator, with the user prompt, and the predefined instruction. A first model response 207 is received, comprising the structured configuration output 112 (not shown in FIG. 2).

As described above, in the second GAI stage, the model interface 108 generates a second model query 210 based on the input query 102 and the extraction output 116. In FIG. 2, a security context indicator extracted by the context generator 202 is also used to generate the second model query 210. In this particular example, a second template prompt 208 is populated with the security indicator, with the user prompt, and the predefined instruction.

In one sense, the second GAI stage is comparable to retrieval-augmented generation (RAG). In RAG, some external retrieval module is used to reduce the size of a corpus of information inputted to a GML model. In the present example, a parallel can be seen, as the extraction output 116 (rather than the full policy data) is passed to the GML model 110 in the second GAI stage. However, in contrast to conventional RAG systems, the GML model 110 itself or a second GML model is used in the first GAI stage to determine the subset of information passed to the GML model 110 in the second GAI stage. A weakness of conventional RAG systems is their reliance on an 'external' retrieval model outside of the GML architecture. In such cases, GML performance is limited by the performance of the external retriever model. In the present examples, GAI is used not only to interpret the extraction output 116, but also to determine how the extraction output 116 is generated via the GML-generated structured configuration output 112 of the first GAI stage.

In one embodiment, the same security context indicator is used to search the instruction database 105 and to generate the first and second model queries 206, 210. In another embodiments, different security context indicators are used.

An example of the first prompt template 204 is given below.

A solution type field is populated with a security context indicator determined based on policy type. The security context indicator is a policy type identifier in one embodiment.

A solution overview can be hard-coded, or configurable based on context information extracted by the context generator 202.

A property definitions field is populated based on the policy or policies 115.

Figure 3:
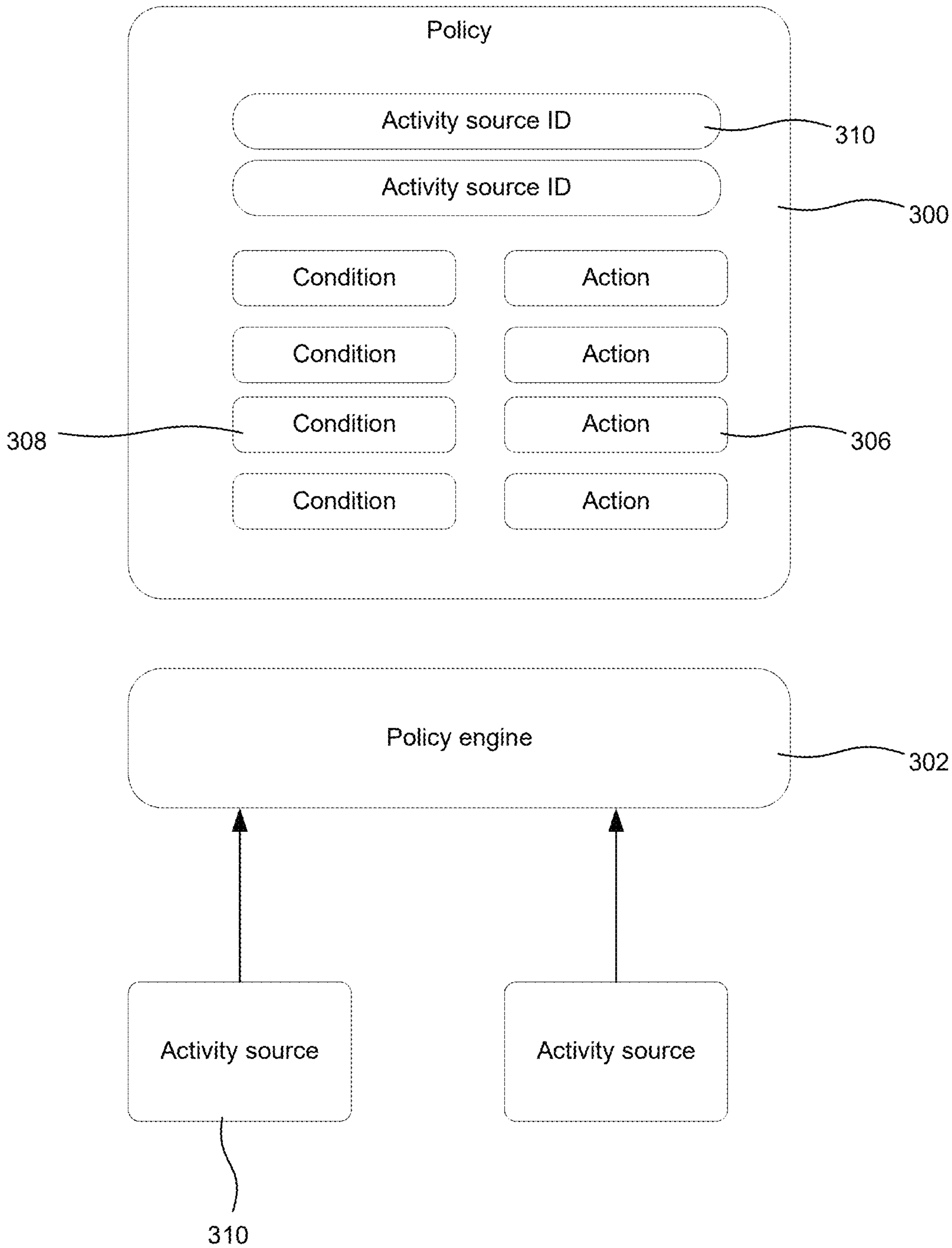
FIG. 3 depicts an example schematic block diagram of a policy and policy engine.

In some implementations, a policy comprises a set of rules, where each rule comprises a condition and an action (see e.g., FIG. 3.) Properties can relate to conditions or actions. The property definitions filed is populated with a description of policy properties to enable the GML model 110 to interpret the policy or policies 115.

A MapperSkillExample field is populated with example pair(s) each example pair comprising a predefined query 107A and associated configuration instruction(s) 107B. For example, the associated configuration instruction(s) 107B may take the form of an example structured configuration output (to guide the GML model in generating the structured configuration output 116).

A user request field is populated with the input query 102.

```
<|im_start|>system
Introduction:
You are an expert helper to a {{SolutionType}} policy assistant. The policy assistant's main
function is to make user understand the policy based on policy json keys and values for the
question user has asked. As a helper you have to read the user query, and suggest what could
be the scenario, and what functions should be called to process the policy json so that the
policy assistant can answer the user question
Solution Overview
{{SolutionOverview}}
Task Overview
```

Your task, as a helper to policy assistant, is to identify, based on the user query provided 1. ScenarioName: It could be one of three types:

a. PolicyQnA: if it is a simple question answer scenario, where policy json can be used to answer the user query. b. PolicyAggregation: if it is a scenario where the policy json needs to be aggregated based on one or more keys. c. PolicyGap: if it is a scenario where the policy json needs to be compared with another policy json to identify the gaps. 2. Predefined Functions which should be called. The original input is a JSON Array of policies. Each policy is a JSON object. One policy can have one or more rules. Each rule is a JSON object. Use predefined functions to process the input to answer the user query. There are 3 types of functions which can be called: Filter, Selector and Aggregator. The original JSON Array will be be processed by one or more pipelines. Each pipeline will process the original JSON in the order of Filter, Selector and Aggregator. There can be only one Filter, Selector and Aggregator in a pipeline. If some function is not required, mention it as null. The supported functions are: a. SimpleFilter. Filter the input JSON array with the given filter string. It has one parameter "FilterString" which is a string in the format of a JsonPath expression. The output of this function will be the filtered JSON array. b. SimpleSelector. Only keep the required keys from the input JSON array to reduce data size. It has one parameter "SelectedFields" which is an array of string. Each string is a key in the JSON object of the input JSON array. The selected fields can be top-level ones such as "Name". Or child fields such as "Rules.Name", in this example, Rules can be an array or an object. The output of this function will be the JSON array with only the selected fields. c. SimpleAggregator. Aggregate the input JSON array to a single JSON object. It has 4 parameters: "AggregatorType", "GroupByFields", "Description", "TargetField". "AggregatorType" is a string which can be "Count", "Sum", "Average", "Max", "Min" "GroupByFields" is an array of string. Each string is a key in the JSON object of the input JSON array, and must be top-level. "Description" is a string which describes the aggregation. "TargetField" is a string. It's a key in the JSON object. e.g. Average of 'Amount', 'Amount' is the target field. It can be null for some aggregators such as Count. The output of this function will be a single JSON object with the aggregated value. d. PolicySummaryAggregator. Summarize all or selected policies, generate a report and get deep insight into the current policy posture. It doesn't have parameters. Selector is not needed when this aggregator is selected.

Instructions for output format
Output should be a JSON array in JSON minified format. The array has one or more JSON object.
Each JSON object in the array represents a pipleline and has the following keys:
Scenario. It can be "PolicyQnA", "PolicyAggregation" or "PolicyGap"
Filter. It's a JSON object which has 2 keys, "Name" and "Parameters". "Name" is the name of the function. "Parameters" is a JSON object which contains the parameters of the function. It is "null" if there is no filter required for the current user query.
Selector. It's a JSON object which has 2 keys, "Name" and "Parameters". "Name" is the name of the function. "Parameters" is a JSON object which contains the parameters of the function. It is empty array [ ] if no selected fields can answer the user query.
Aggregator. It's a JSON object which has 2 keys, "Name" and "Parameters". "Name" is the name of the function. "Parameters" is a JSON object which contains the parameters of the function. It is "null" if there is no filter required for the current user query.
The output must start with '[' and end with ']'.
Property Definitions for reference
Below are all the properties and their definitions which are available for use to filter selector and aggregator functions.
{{PropertyDefinitions }}
Please follow the sample user question and ideal output below to understand how you should answer the user query
{{MapperSkillExamples}}
Now, generate proper minified JSON response for the below user query:
<|im_end|> <|im_start|>user user query: {{UserRequest}} <|im_end|>

Below is one example of an entry in the instruction database 106 in JSON format. In this example, a predefined query is stored in a Prompt field, which in turn is vectorized for comparison with a vectorize input query.

```
{
    "Prompt": "Explain this policy to me ",
    "Scenario": "PolicyQnA",
"DataProcess": [
  {
    "Filter": null,
    "Selector": {
        "Name": "SimpleSelector",
        "Parameters": {
            "SelectedFields": [
              "Rules.NotifyPolicyTipCustomText",
              "Rules.DisplayName",
              "Rules.GenerateAlert",
              "Rules.ContentContainsSensitiveInformation",
              "Rules.AdvancedRule",
              "Rules.AlertProperties",
              "Rules.EndpointDlpRestrictions",
              "DisplayName",
              "Rules.SubjectOrBodyContainsWords",
              "Rules.Workload",
              "Workload"
            ]
        }
    },
    "Aggregator": null
  }
],
  "Template": "Respond in Question Answer format covering, Where is your policy looking for data?, What kind of data is the policy are looking for?, What user activities trigger the policy?, How are the end users impacted?, How will the admins be notified?",
  "ResponseGuideline": "Respond in Question Answer format covering, Where is your policy looking for data?, What kind of data is the policy are looking for?, What user activities trigger the policy?, How are the end users impacted?, How will the admins be notified?"
}
```

A DataProcess field contains data used in the first GAI stage. Those data guide the GML model 110 to generate processing logic in the form of a structured configuration output, which in turn is used to configure the extractor code module 114 to filter and aggregate the original policy data.

Template and ResponseGuideline fields are used in the second GAI stage. These two elements provide additional context to the GML model 110 GPT to generate the model well as the configuration instruction(s) 107B retrieved from the instruction database 105. The structured data in the instruction database 105 informs the generation of these outputs, but these outputs are bespoke to the input query 102, and may therefore deviate from the specific structured configuration output example(s) passed to the GML model 110 from the instruction database 105.

TABLE 1

| Example Prompt | Example output of GML model 110 |
|---|---|
| Explain this policy to me | {<br>"Scenario": "PolicyQnA",<br>"Filter": {<br>"Name": "SimpleFilter",<br>"Parameters": {<br>"FilterString": "$[?(@.Guid == 'Id1')]"<br>}<br>},<br>"Selector": {<br>"Name": "SimpleSelector",<br>"Parameters": {<br>"SelectedFields":<br>["Mode", "CreationTimeUtc","CreatedBy", "LastModifiedBy", "Policy RBACScopes",<br>"DisplayName","Workload","Name","Guid","Rules"]<br>}<br>},<br>"Aggregator": null<br>} |
| What is the coverage for the selected policies? | [{<br>"Scenario": "PolicyQnA",<br>"Filter": {<br>"Name": "SimpleFilter",<br>"Parameters": {<br>"FilterString": "$[?(@.Guid == 'Id1' \|\| @.Guid == 'Id2')]"<br>}<br>},<br>"Selector": null,<br>"Aggregator": {<br>"Name": "SimpleAggregator",<br>"Parameters": {<br>"AggregatorType": "Count",<br>"GroupByFields": ["Workload"],<br>"Description": "Calculate the policies count for each workload."<br>}<br>}<br>}] |

response 118. Whilst in the above example, these fields have the same contents, different data can be contained in the Template and Response Guideline fields in general.

The full JSON object is ingested into the instruction database 105, and the embedding of "Prompt" is used for similarity search, enabling the lookup module 106 to can return the most semantical similar JSON objects based on the input query 102. For example, given an input query "Can you explain the policy to me?", the above data might be returned from the instruction database 105 as most similar. The Prompt field and DataProcess field are respective examples of an input query (that is, a predefined input) and corresponding example structured configuration output. The Scenario field is an example of security context data that can be matched to a security context of the input query 102 generated by the context extractor 202.

Table 1 below shows examples of possible structured configuration outputs (112 in FIGS. 1-2) generated by the GML model 110 in the first GAI stage. Note, these outputs are generated dependent on the specific input query 102, as The example outputs of Table 1 are generated based on the input prompt 102, the configuration instruction(s) 107B from the instruction database 105 (e.g., the Prompt field and DataProcess field), and a description of one or more pre-defined functions implemented by the extractor module 114 (e.g. filter/selector/aggregator). The output specifies one or more functions and one or more parameters which will be applied to the policy or policies 115.

In a complex system, a large number (e.g., hundreds) of policies or rules may be defined. Improvements in machine efficiency and GAI performance are achieved by passing only a subset of filtered policy data to the GML model 110 in the second GAI stage. In the first GAI stage, the GML model 110 generates process logic based on the input query 102, which is used to reduce the data size but keep the required information. Certain tasks that the GML model 110 is less suited to are performed by predefined functions in the extractor module 114. For example, if the GML model 110 is not effective at counting policies, it can instead generate the following aggregator configuration, which will be used by the extractor module 114 to obtain the count:

```
"Aggregator": {
  "Name": "SimpleAggregator",
  "Parameters": {
    "AggregatorType": "Count",
    "GroupByFields": ["Workload"],
    "Description": "Calculate the policies count for each workload."
  }
}
```

An example of a policy selection structured configuration output is given below:

```
["Name", "Workload", "Rules.Name"]
Example Mapper Skill output
{
  "Name": "SimpleSelector",
  "Parameters": {
    "SelectedFields":
["Mode","DisplayName", "Workload", "Name","Guid", "Rules.Name"]
  }
    }
```

This causes the extractor module 114 to select the following properties of the policy or policies 115: "Mode", "DisplayName", "Workload", "Name", "Guid", "Rules. Name".

As example of a policy filtering structured configuration output is given below:

```
{
"Name": "SimpleFilter",
  "Parameters": {
    "FilterString": "$[?(@.Guid == 'Id1')]"
  }
}
```

This cases the extractor module 114 to filter the one or more policies 115 (or a selected subset of their properties) based on a defined input string.

FIG. 3 shows a schematic representation of a form of security policy 300 used in some implementations. The security policy 300 comprises a set of rules, where each rule comprises a condition 304 and an action 306 associated with the condition 304 (e.g. a condition relating to a file transfer, file deletion or file modification etc. associated with a block action, alert action etc.) In some examples, a policy specifies one or more activity sources to be monitored. In the depicted example, the security policy 300 comprises an activity source identifier 308 of each activity source 310 to be monitored. Examples of activity source include devices, system, processes, applications, users, networks, network addresses, cloud services, log repositories (e.g. to monitor activity as it is logged), endpoint agents (e.g., software agents deployed to endpoint devices to monitor and report local activity) etc. When the security policy 300 is active, the security policy 300 runs in a policy engine 302. The policy engine 302 monitors activity signals associated with each activity source 310 in respect of the policy conditions. In response to determining that the activity signals satisfy a condition 304 of the security policy 300, the policy engine 302 automatically triggers the associated action 306. Rules can be defined hierarchically. Properties can relate to conditions or actions. The property definitions filed is populated with a description of policy properties to enable the GML model 110 to interpret the policy or policies 115.

Figure 4A:
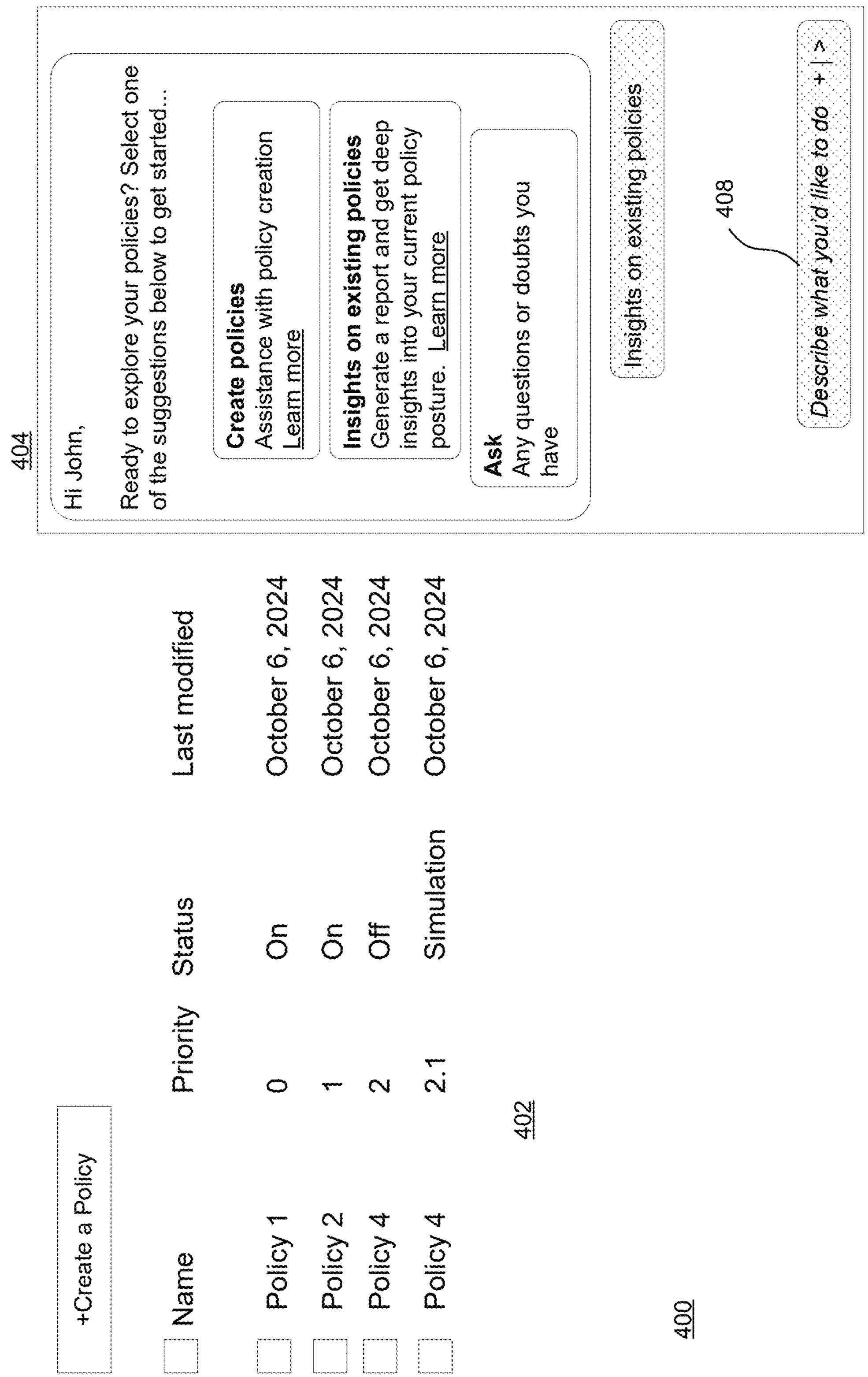
FIG. 4A shows a first example schematic graphical user interface view.

FIG. 4A shows a schematic example graphical user interface (GUI) 400 interface via which a user can view and select security policies, and run input queries on them. A policy interface 402 is shown on the left hand side, in which existing policies and their attributes are listed (e.g. priority, status, date of last modification). A conversation interface 404 is shown to the right hand side, via which the user can select predefined queries or enter via an input field 408 open natural language queries. User-entered queries are, in turn, used to generate GML prompts. In the context of FIG. 1 and FIG. 2, in some embodiments, the input query 102 is a user query entered via the input field 408.

Figure 4B:
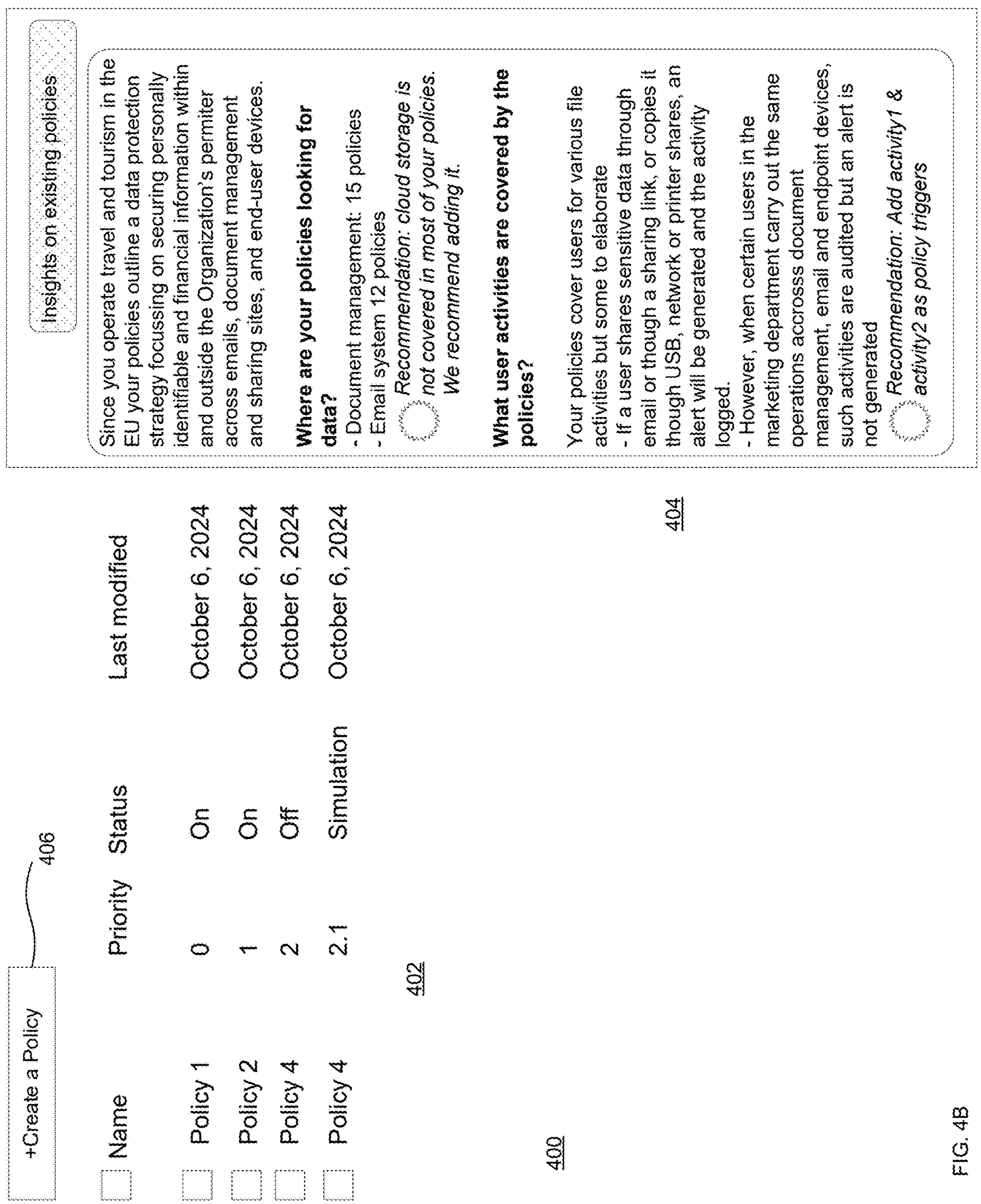
FIG. 4B shows a second example schematic graphical user interface view.

FIG. 4B shows the GUI 400 when a query response (e.g. query response 120) has been generated and outputted in the conversation interface 404. Using the techniques described above, the GML model 110 has been able to accurately summarize the user's policies, identify inconsistencies and potential security weaknesses in those policies (such as lack of coverage or inconsistently between policy actions and/or conditions. Whilst in the example of FIG. 4B, recommendations for implementing or modifying a policy are outputted to a user, in other embodiments a new policy is generated or an existing policy is modified automatically based on the query response 120. In other embodiments, a recommendation is selectable to automatically implement the recommendation, e.g. by generating or modifying a policy.

The GUI 400 gives a user the ability to understand a specific policy or group of policies in natural language, e.g. though summary or aggregation over policies, or policy question-and-answer. It also enables the user to understand gap between a desired security posture and existing policies, such as gaps in activity source coverage, potentially missing or inconsistent conditions, and potentially missing, inconsistent or incomplete actions. Examples of input queries the system can accommodate include: "What do these policies do?"; "Summarize all DLP policies", "Summarize enabled DLP policies", "What users are covered in these policies?", "What SITs are covered in the policies", "When will this policy be triggered?", "Is this policy securing my private information?", "How is this policy different from X template?", "What all needs to be covered in these policies?", and "Is this policy securing my private information?" Although each of the preceding examples considers a question, as noted the term "query" is used herein in a broader sense to mean any form of input. A query could, for example, take the form of a direct instruction such as "Extend this policy to admin users", "Make sure this condition is applied to all users", or "Add file download activity as a condition for all users in the marketing group"; or a more general instruction such as "Identify any policy gaps and modify the policy to close these gaps" or "check this policy is complete, and if it is not complete, list any policy gaps and steps for closing them, and if it is complete, deploy and activate the policy". Whilst the preceding examples consider natural language prompts expressing questions, instructions etc., as noted queries can take other forms, such as structured commands, voice commands etc.

The GUI 400 reduces the number of human-machine interactions required for a user to complete tasks, and increases the speed at which they can do so. For instance, to "get a count of all policies applied to email," a user would conventionally need to click through each policy in a graphical user interface (e.g. a policy management portal) to check policy locations manually. With the GUI 400, the user need only enter a single query to perform the same task. The system retrieves all properties of the policies, but the first GAI stage identifies only the necessary properties to answer the user's query, minimizing the data that needs to processed using GML in the second GAI stage.

Figure 5:
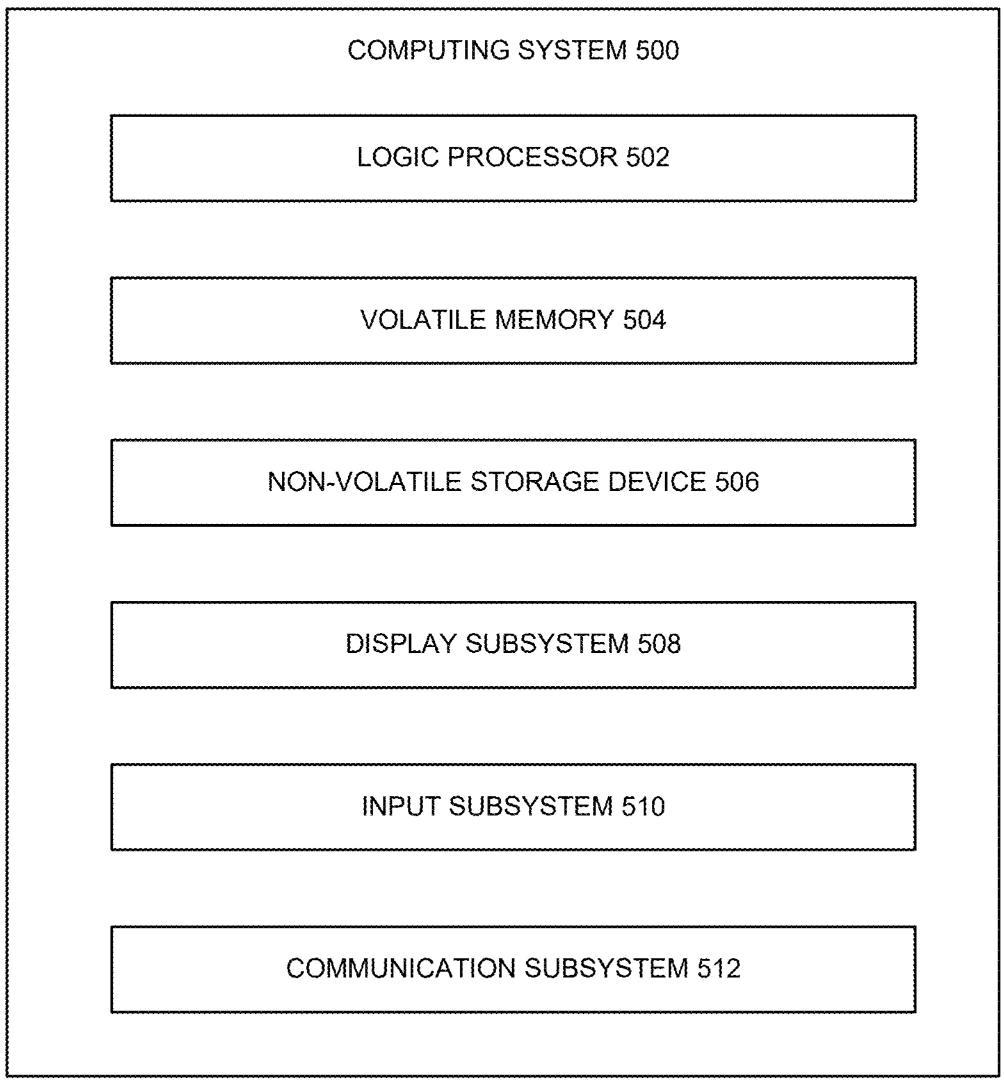
FIG. 5 shows an example computing platform.

FIG. 5 schematically shows a non-limiting example of a computing system 500, such as a computing device or system of connected computing devices, that can enact one or more of the methods or processes described above. Computing system 500 is shown in simplified form. Computing system 500 includes a logic processor 502, volatile memory 504, and a non-volatile storage device 506. Computing system 500 may optionally include a display subsystem 508, input subsystem 510, communication subsystem 512, and/or other components not shown. Logic processor 502 comprises one or more physical (hardware) processors configured to carry out processing operations. For example, the logic processor 502 may be configured to execute instructions that are part of one or more applications, programs, routines, libraries, objects, components, data structures, or other logical constructs. The logic processor 502 may include one or more hardware processors configured to execute software instructions based on an instruction set architecture, such as a central processing unit (CPU), graphical processing unit (GPU), tensor processing unit (TPU) or other form of accelerator processor. Additionally or alternatively, the logic processor 502 may include a hardware processor(s)) in the form of a logic circuit or firmware device configured to execute hardware-implemented logic (programmable or non-programmable) or firmware instructions. Processor(s) of the logic processor 502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor 502 may be virtualized and executed by remotely accessible, networked computing devices configured in a cloud-computing configuration. In such a case, these virtualized aspects are run on different physical logic processors of various different machines. Non-volatile storage device 506 includes one or more physical devices configured to hold instructions executable by the logic processor 502 to implement the methods and processes described herein. When such methods and processes are implemented, the state of non-volatile storage device 506 may be transformed—e.g., to hold different data. Non-volatile storage device 506 may include physical devices that are removable and/or built-in. Non-volatile storage device 506 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive), or other mass storage device technology. Non-volatile storage device 506 may include nonvolatile, dynamic, static, read/write, read-only, sequential-access, location-addressable, file-addressable, and/or content-addressable devices. Volatile memory 504 may include one or more physical devices that include random access memory. Volatile memory 504 is typically utilized by logic processor 502 to temporarily store information during processing of software instructions. Aspects of logic processor 502, volatile memory 504, and non-volatile storage device 506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example. The terms "module," "program," and "engine" may be used to describe an aspect of computing system 500 typically implemented in software by a processor to perform a particular function using portions of volatile memory, which function involves transformative processing that specially configures the processor to perform the function. Thus, a module, program, or engine may be instantiated via logic processor 502 executing instructions held by non-volatile storage device 506, using portions of volatile memory 504. Different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc. When included, display subsystem 508 may be used to present a visual representation of data held by non-volatile storage device 506. The visual representation may take the form of a GUI. As the herein described methods and processes change the data held by the non-volatile storage device, and thus transform the state of the non-volatile storage device, the state of display subsystem 508 may likewise be transformed to visually represent changes in the underlying data. Display subsystem 508 may include one or more display devices utilizing virtually any type of technology. Such display devices may be combined with logic processor 502, volatile memory 504, and/or non-volatile storage device 506 in a shared enclosure, or such display devices may be peripheral display devices. When included, input subsystem 510 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor. When included, communication subsystem 55 may be configured to communicatively couple various computing devices described herein with each other, and with other devices. Communication subsystem 55 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the internet. The term computer readable media as used herein includes computer storage media. Computer storage media includes for example volatile and non-volatile, removable and nonremovable media (e.g., volatile memory 504 or non-volatile storage 506) implemented in any method or technology for storage of information, such as computer readable instructions, data structures, or program modules. Computer storage media includes for example RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by a computing device (e.g. the computing system 500 or a component device thereof). Computer storage media does not include a carrier wave or other propagated or modulated data signal. Communication media is embodied for example by computer readable instructions, data structures, program modules, or other data in a modulated data signal, such as a carrier wave or other transport mechanism, and includes any information delivery media. The term "modulated data signal" describes a signal that has one or more characteristics set or changed in such a manner as to encode information in the signal. By way of example, and not limitation, communication media includes wired media such as a wired network or direct wired connection, and wireless media such as acoustic, radio frequency (RF), infrared, and other wireless media.

According to a first aspect herein, a computer-implemented method comprises: receiving an input query relating to a security policy; matching the input query with a predefined query stored in an instruction database; based on matching the input query with the predefined query, retrieving from the instruction database a predefined configuration instruction associated with the predefined query; inputting, to a generative machine learning (GML) model, a first model query based on the input query and the predefined configuration instruction; receiving from the GML model, in response to the first model query, a structured configuration output; executing a predetermined extractor code module on the security policy based on the structured configuration output, resulting in an extraction output; inputting, to the GML model or a second GML model, a second model query based on the input query and the extraction output; receiving a response from the GML model or the second GML model, in response to the second model query; and based on the response, causing an action relating to the security policy to be performed.

In embodiments of the first aspect, the predetermined extractor code module may comprise a selector module that extracts a data item from a field of the security policy, the extraction output comprising the data item.

In embodiments, the input query may relate to multiple security policies, and the predetermined extractor code module may alternatively or additionally comprise an aggregator module that generates aggregate policy data from the multiple security policies, the extraction output comprising the aggregate policy data.

In embodiments, the predetermined extractor code module may alternatively or additionally comprise a filtering module that retrieves the security policy based on a security policy identifier associated with the input query, wherein the extraction output may comprise the security policy or information extracted from the security policy (e.g. data item, aggregate policy information etc.).

The method may comprise storing the security policy in a cache (e.g. in-memory cache, distributed cache etc.), with the predetermined extractor code module operating on the security policy stored in the cache.

In embodiments, the first model query may be generated additionally based on the predefined query, e.g. the predefined query may be associated with the predefined configuration instruction in the first model query.

The method may comprise determining based on the input query a security context indicator that relates to the security policy, wherein the first model query is generated based on the input query, the predefined configuration instruction, the security context indicator, and a first template query (e.g., prompt).

For example, the first template query may be populated with the input query, the predefined configuration instruction, and the security context indicator, resulting in the first model query.

Alternatively or in addition, the method may comprise determining based on the input query a security context indicator that relates to the security policy, wherein the second model query is generated based on the input query, the extraction output, the security context indicator, and a second template query.

For example, the second template query may be populated with the input query, the extraction output, and the security context indicator, resulting in the second model query.

According to a second aspect herein, a computer-implemented method comprises: receiving an input query relating to a security policy; determining based on the input query a security context indicator that relates to the security policy; matching the input query with a predefined query stored in an instruction database; based on matching the input query with the predefined query, retrieving from the instruction database a predefined instruction associated with the predefined query; generating a model query based on the security context indicator, the input query, the predefined instruction and a template query; inputting, to a generative machine learning (GML) model, the model query; and based on the response, causing an action relating to the security policy to be performed.

In embodiments of the second aspect, the input query may comprise a policy identifier and the security context indicator may be determined based on the security policy identifier.

In embodiments, the security policy indicator may comprise a policy type (e.g. data loss prevention, information protection, antivirus, website blocking etc.). The same template query may be used for different policy types.

In embodiments, generating the model query may comprise populating the template query with the security context indicator, the input query, and the predefined instruction.

In embodiments, the security context indicator or a second security context indicator determined from the input query may be used to retrieve the predefined instruction.

In embodiments of either aspect, the method may comprise extracting information about the security policy from the response, and causing the action may comprise causing the information to be displayed at a user interface. In some such embodiments, the input query may be received via the user interface. The user interface may be local to or remote from a computer system implementing the method.

In embodiments, the input query may be a freeform natural language query.

In embodiments, the response to the second model query may comprise a gesture report relating to the security policy.

In embodiments, the action may alternatively or additionally comprise updating or modifying the security policy, or performing a security mitigation action.

The method may comprise encoding the input query, resulting in an input query embedding vector, and matching the input query with a predefined query stored in an instruction database may comprise matching the input query embedding vector with a predefined query embedding vector that encodes the predefined query.

Further aspects provide a computer system configured to implement any above method, and a computer-readable storage medium comprising computer-readable instructions for programming the same.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the present disclosure.

The invention claimed is:

1. A computer-implemented method, comprising:

receiving an input query relating to a security policy;

matching the input query with a predefined query stored in an instruction database;

based on matching the input query with the predefined query, retrieving from the instruction database a predefined configuration instruction associated with the predefined query;

inputting, to a generative machine learning (GML) model, a first model query based on the input query and the predefined configuration instruction;

receiving from the GML model, in response to the first model query, a structured configuration output;

executing a predetermined extractor code module on the security policy based on the structured configuration output, resulting in an extraction output;

inputting, to the GML model or a second GML model, a second model query based on the input query and the extraction output;

receiving a response from the GML model or the second GML model, in response to the second model query; and based on the response, causing an action relating to the security policy to be performed.

2. The method of claim 1, wherein the predetermined extractor code module comprises a selector module that extracts a data item from a field of the security policy, the extraction output comprising the data item.

3. The method of claim 1, wherein the input query relates to multiple security policies, and the predetermined extractor code module comprises an aggregator module that generates aggregate policy data from the multiple security policies, the extraction output comprising the aggregate policy data.

4. The method of claim 1, wherein the predetermined extractor code module comprises a filtering module that retrieves the security policy based on a security policy identifier associated with the input query, wherein the extraction output comprises the security policy or information extracted from the security policy.

5. The method of claim 1, comprising extracting information about the security policy from the response, and causing the action comprises causing the information to be displayed at a user interface, wherein the input query is received via the user interface.

6. The method of claim 1, wherein the action comprises updating or modifying the security policy, or performing a security mitigation action.

7. The method of claim 1, comprising encoding the input query, resulting in an input query embedding vector, wherein matching the input query with the predefined query comprises matching the input query embedding vector with a predefined query embedding vector that encodes the predefined query.

8. The method of claim 1, comprising determining based on the input query a security context indicator that relates to the security policy, wherein the first model query is generated based on the input query, the predefined configuration instruction, the security context indicator, and a first template query.

9. The method of claim 8, wherein the first template query is populated with the input query, the predefined configuration instruction, and the security context indicator, resulting in the first model query.

10. The method of claim 1, comprising:

determining based on the input query a security context indicator that relates to the security policy, wherein the second model query is generated based on the input query, the extraction output, the security context indicator, and a second template query.

11. The method of claim 10, wherein the second template query is populated with the input query, the extraction output, and the security context indicator, resulting in the second model query.

12. A computer system comprising:

a memory embodying computer-readable instructions;

a processor coupled to the memory, the computer-readable instructions configured when executed by the processor to perform operations of:

receiving an input query relating to a security policy;

determining based on the input query a security context indicator that relates to the security policy;

matching the input query with a predefined query stored in an instruction database;

based on matching the input query with the predefined query, retrieving from the instruction database a predefined instruction associated with the predefined query;

generating a model query based on the security context indicator, the input query, the predefined instruction and a template query;

inputting, to a generative machine learning (GML) model, the model query; and based on a response, causing an action relating to the security policy to be performed.

13. The computer system of claim 12, wherein the security context indicator comprises a policy type identifier.

14. The computer system of claim 12, wherein the operations comprise:

encoding the input query, resulting in an input query embedding vector, wherein matching the input query with the predefined query comprises matching the input query embedding vector with a predefined query embedding vector that encodes the predefined query.

15. The computer system of claim 12, wherein the operations comprise:

extracting information about the security policy from the response, and causing the action comprises causing the information to be displayed at a user interface, wherein the input query is received via the user interface.

16. The computer system of claim 12, wherein the action comprises updating or modifying the security policy, or performing a security mitigation action.

17. Computer-readable storage media embodying computer-readable instructions, the computer-readable instructions configured when executed by a processor to perform operations of:

receiving an input query relating to a security policy;

matching the input query with a predefined query stored in an instruction database;

based on matching the input query with the predefined query, extracting from the instruction database a predefined configuration instruction associated with the predefined query;

inputting, to a generative machine learning (GML) model, the input query and the predefined configuration instruction;

receiving from the GML model, in response to the input query and the predefined configuration instruction, a structured configuration output;

executing a predetermined extractor code module on the security policy based on the structured configuration output, resulting in an extraction output;

inputting, to the GML model or a second GML model, the input query and the extraction output;

receiving a response from the GML model or the second GML model, in response to the input query and the extraction output; and based on the response, causing an action relating to the security policy to be performed.

18. The computer-readable storage media of claim 17, wherein the predetermined extractor code module comprises a selector module that extracts a data item from a field of the security policy, the extraction output comprising the data item.

19. The computer-readable storage media of claim 17, wherein the input query relates to multiple security policies, and the predetermined extractor code module comprises an aggregator module that generates aggregate policy data from the multiple security policies, the extraction output comprising the aggregate policy data.

20. The computer-readable storage media of claim 17, wherein the predetermined extractor code module comprises a filtering module that retrieves the security policy based on a security policy identifier associated with the input query, wherein the extraction output comprises the security policy or information extracted from the security policy.

* * * * *